United States Patent [19]
Wennerstrom et al.

[11] Patent Number: 5,265,983
[45] Date of Patent: Nov. 30, 1993

[54] CASCADING PRESSURE CONTINUOUS BLOW BOTTLE

[75] Inventors: Jerald M. Wennerstrom, Stark County, Ohio; Michael G. Radin, Chester County, Pa.

[73] Assignee: The Babcock & Wilcox Company, New Orleans, La.

[21] Appl. No.: 889,929

[22] Filed: Jun. 2, 1992

[51] Int. Cl.[5] .................... B65G 53/66; B65G 53/46; B65G 53/36
[52] U.S. Cl. .................... 406/24; 406/124; 406/62
[58] Field of Search ............... 406/124–126, 406/23–25, 62, 63, 65, 136

[56] References Cited

U.S. PATENT DOCUMENTS

| | | | |
|---|---|---|---|
| 1,735,392 | 11/1929 | Hiller . | |
| 2,732,086 | 1/1956 | Schnyder | 214/17 |
| 3,150,962 | 9/1964 | Pearson | 75/42 |
| 3,151,784 | 10/1964 | Tailor | 222/368 |
| 3,204,942 | 9/1965 | Matthys et al. | 266/28 |
| 3,301,544 | 1/1967 | Eft et al. | 266/28 |
| 3,556,606 | 1/1971 | Woods, Jr. . | |
| 3,689,045 | 9/1972 | Coulter et al. | 266/28 |
| 3,720,351 | 3/1973 | Coulter et al. | 222/1 |
| 3,729,105 | 4/1973 | Huebler et al. | 214/17 B |
| 3,775,071 | 11/1973 | Hoffert et al. | 48/197 R |
| 4,004,647 | 1/1977 | Forst et al. | 177/128 |
| 4,027,920 | 6/1977 | Wennerstrom . | |
| 4,097,092 | 6/1978 | Lapple . | |
| 4,244,705 | 1/1981 | Seidl et al. | 48/77 |
| 4,247,240 | 1/1981 | Schora, Jr. et al. | 414/218 |
| 4,397,657 | 8/1983 | Selep et al. | 48/86 R |
| 4,401,402 | 8/1983 | Casperson | 414/218 |
| 4,482,275 | 11/1984 | Shinozaki et al. | 406/124 X |
| 4,668,130 | 5/1987 | Sharp | 406/14 |
| 4,758,118 | 7/1988 | Rachner et al. | 406/24 |

FOREIGN PATENT DOCUMENTS

| | | | |
|---|---|---|---|
| 1293650 | 4/1962 | France | 406/24 |
| 31438 | 2/1985 | Japan | 406/23 |

OTHER PUBLICATIONS

Technical Paper–"Blast Furnace Coal Injection:Long Proven now Economical"–Sexton & Wennerstrom, Presented to Assoc. of Iron and Steel Engineers, Chicago, Ill.–Sep.1982–9 pages Incl. cover.
"An Introduction to Blast Furnace Coal Injection"–by I. F. Carmichael–Iron & Steel Maker (Itsn), Mar. 1992, pp.67
Joint Armco/Babcock & Wilcox Product Brochure–'Use Less Coke with Blast Furnace Coal Injection'–#1200-0071 Feb. 1992.

Primary Examiner—Margaret A. Focarino
Assistant Examiner—James M. Kannofsky
Attorney, Agent, or Firm—Robert J. Edwards; Vytas R. Matas; Eric Marich

[57] ABSTRACT

A system and method for continuously transporting fine solids in dense phase includes a blow bottle having an upper inlet for receiving fine solids under pressure, an intermediate inlet for receiving process media, and a lower inlet for receiving fluidizing media. The media is preferably air, but other gases or inert gases may be used. The fine solids are conveyed from a feed hopper through a variable speed rotary feeder into a drop chute having an expansion joint and thereafter through a constant speed rotary feeder to the inlet of the bottle. The variable speed feeder controls the rate of fine solids being discharged in dense phase from the bottle. The fluidizing media fluidizes the fine solids in the bottle, and the process media conveys the fine solids out of the bottle in continuous, dense phase flow to an outlet conduit. A signal corresponding to the weight of the bottle is provided to a control valve connected in the process media supply line to maintain a constant solids level inventory in the bottle. A higher sensed weight opens the control valve to admit more process media to the bottle, thus increasing the pressure in the bottle and the rate at which the solids are discharged therefrom. The weight of solids level inventory reduces to the desired value. A lower sensed weight causes the control valve to close, less process media is admitted to the bottle, and the solids level inventory increases to the desired value.

32 Claims, 2 Drawing Sheets

CASCADING PRESSURE CONTINUOUS BLOW BOTTLE

FIELD AND BACKGROUND OF THE INVENTION

The present invention relates in general to equipment and methods for conveying pulverized material, and in particular to a new and useful blow bottle assembly and method for continuously transporting fine solids in dense phase in intrafurnace (into a furnace) sorbent injection applications.

Continuous flow, high pressure feed systems contain either two pressure blow bottles in parallel or three lock hoppers in series. These systems have a relatively high ratio of solids to actual unit volume of gas and are often referred to as "dense phase" systems. These systems operate on the principle of converting static pressure to velocity pressure via sequencing batch processes. On lower pressure systems, where the ratio of solids to gas volume is relatively low (possibly one tenth or less of that in a dense phase system) a rotary feeder can be used provide a continuous flow by dropping sorbent into a horizontal process pipe. Rotary feeders are generally not used in dense phase transport because of pressure limitations.

The Babcock & Wilcox Company has used continuous blow bottles as part of a pulverized fuel delivery system for several years. This system is known as the PCI (pulverized coal injection) system and is disclosed for example, in U.S. Pat. Nos. 3,689,045 and 3,720,351.

U.S. Pat. No. 4,668,130 also discloses a dense phase coal feeding system wherein carbonaceous solids such as coal and oil shale are fed to a high temperature processing vessel without bridging and plugging problems that would interrupt the flow of the solids into the processing vessel. The solids are passed at a controlled rate from a feed vessel into a first conduit communicating with the feed vessel. The solids are then passed through the first conduit into a second conduit which communicates with the first conduit and the processing vessel, and the second conduit contains a scraper for scraping the inside walls of the conduit. The pressure in the feed vessel is maintained at a level higher than that in the processing vessel by passing a sufficient amount of a gas into the feed vessel such that the solids are passed through the second conduit into the processing vessel in dense phase pneumatic flow as the scraper scrapes the inside walls of the second conduit, thereby preventing any bridging or plugging. Normally, the scraper will consist of a wire helix which is rotated inside the second conduit.

U.S. Pat. No. 4,397,657 teaches an apparatus for feeding a continuous supply of carbonaceous material into a pressurized reactor. A first rotary gas lock is provided for receiving the material from ambient atmospheric conditions. The first rotary gas lock is supplied with a flow of nitrogen as a sealing gas to prevent air from entering the lock and the apparatus. The first lock transfers the material to a second rotary gas lock which in turn transfers the material to a screw conveyor for delivery to the interior of the reactor. The second lock is supplied with a flow of a clean product gas as a buffer gas. The clean product gas supplied to the second lock is at a pressure greater than the pressure in the reactor and prevents flow of gases from the reactor to the apparatus. Thus a continuous feed is provided.

U.S. Pat. No. 4,244,705 discloses a triple rotary gas lock arrangement for providing a continuous feed to a kiln.

U.S. Pat. No. 3,775,071 relates to an apparatus for feeding dry coal to a region of superatmospheric pressure (such as a coal gasifier or coal liquefaction reactor) wherein three pressure hoppers are used; one for low pressure, one for intermediate pressure and one for high pressure.

U.S. Pat. No. 3,729,105 relates to liquid sealed solids lock hoppers and, as stated in the specification, the process may be made continuous by providing two or more lock hoppers for use in tandem.

U.S. Pat. No. 4,247,240 discloses a feed arrangement quite similar to U.S. Pat. No. 3,729,105 discussed earlier.

U.S. Pat. No. 3,556,606 discloses a system for particulate transfer. According to this process, there is provided a method for obtaining uniform flow of particulate matter from a supply source through a flow control means positioned on the outlet thereof, which comprises: sensing the pressure within the supply source on the upstream side of the flow control means; establishing flow in a conduit in by-pass relationship to the flow control means in response thereto from the upstream side of the flow control means to relieve gaseous obstruction to flow; and establishing flow of the particulate matter from the supply source through the flow control means.

None of these patents suggest means for measuring the weight of a single continuous feed flow bottle and means for controlling the process air or gas supplied to the bottle to maintain a continuous dense phase flow from the bottle by keeping the level of solids therein within a given range.

SUMMARY OF THE INVENTION

The present invention was derived from the batch blow bottles used in the aforementioned PCI system of The Babcock & Wilcox Company. There is a maximum duty feeder on the market that can operate at high static pressures up to 400 psig and pressure differentials up to 50 psig with minimal leakage. The high design pressure permits such a feeder to be used in dense phase transport applications only if the special type of blow bottle and the control system of the present invention are utilized. The continuous flow blow bottle system operates on the principle of a continuous conversion of static pressure to velocity pressure. Thus, the sequencing of series or parallel pressure vessels is not required.

The present invention is drawn to a system and method for continuously transporting fine solids in dense phase. The system comprises, in series, an upper variable speed rotary feeder, a lower constant speed rotary feeder, a continuous feed blow bottle having an outlet which transports the material to the process of interest and an arrangement of control valves, as well as interconnections and associated instrumentation for controlling the introduction of fluidizing, process and pressurizing media such as air or gas.

During operation, the raw feed material is fed from a hopper or silo to the upper, variable speed rotary feeder, which controls the solids feed rate to the system. The material then drops into the lower, constant speed rotary feeder whose primary function is to seal against the pressure in the continuous feed blow bottle. Depending upon the pressures required in the continuous feed blow bottle, additional lower, constant speed rotary feeders can be employed in cascade fashion.

Raw solids material in the continuous feed blow bottle is maintained in a fluidized condition by media such as air or gas which enters through a perforated plate at the base of the bottle. Means for weighing the continuous feed blow bottle (load cells or strain gauges) provide signals which indicate the solids level therein; the blow bottle process media (air or gas) pressure is increased or decreased in response to these signals to maintain a constant raw material flow rate exiting the bottle.

The various features of novelty which characterize the invention are pointed out with particularity in the claims annexed to and forming a part of this disclosure. For a better understanding of the invention, its operation and specific advantages attained by its uses, reference is made to the accompanying drawings and descriptive matter in which a preferred embodiment of the invention is illustrated.

DESCRIPTION OF THE PREFERRED EMBODIMENT

Figure 1:
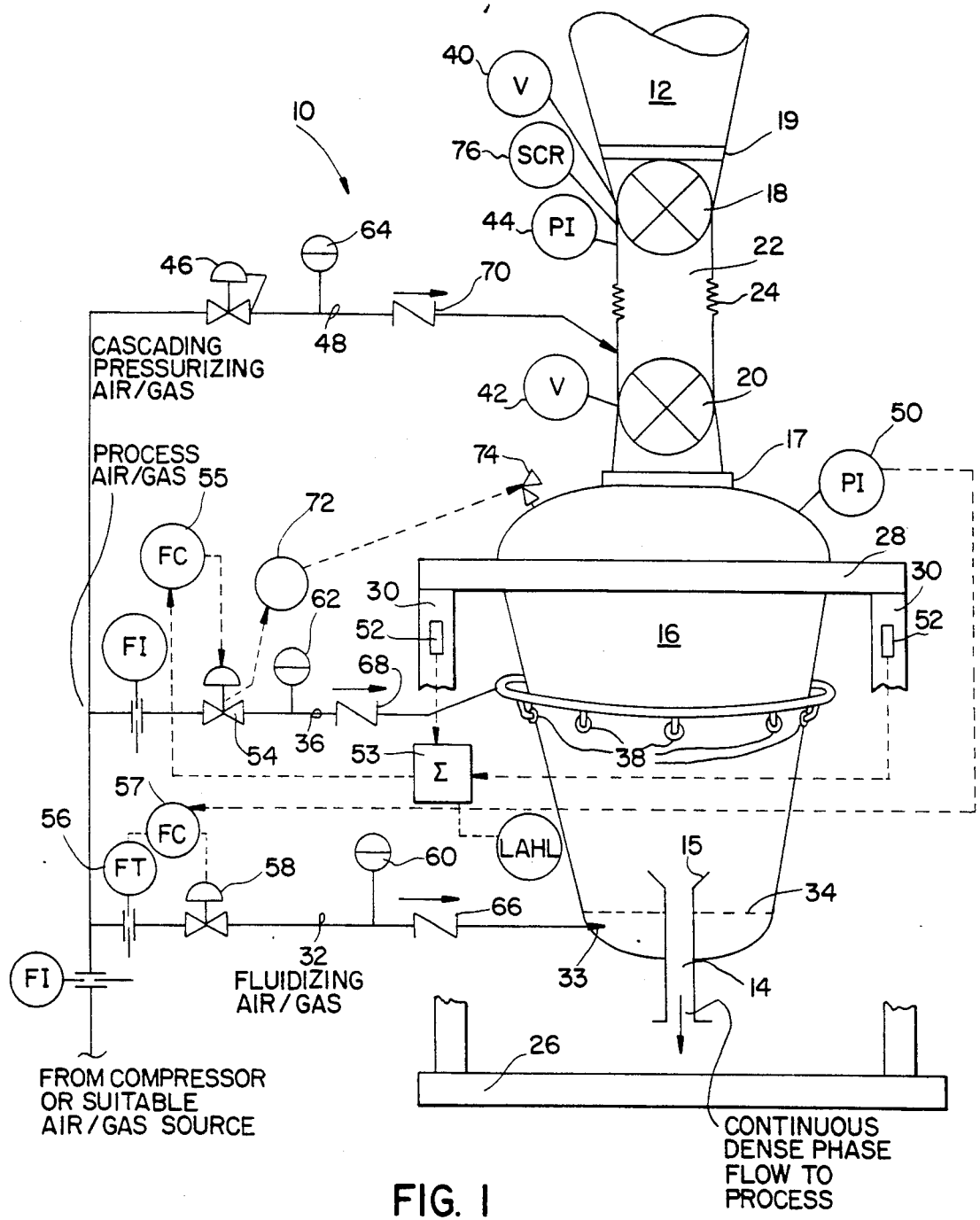
FIG. 1 is a schematic view of one embodiment of the cascading pressure, continuous flow blow bottle system of the present invention.

Referring to FIG. 1 in particular, the invention embodied therein comprises a cascading pressure continuous blow bottle (CPCBB) assembly 10 which is used to transport fine solids from a hopper or silo 12, in dense phase to an outlet discharge conduit 14. One of the unique features of this system is that material can be continuously fed in dense phase to a given process using only *one* blow bottle 16. Other manufacturers of dense phase transport equipment generally must use two or more batch process blow bottles or lock hoppers in parallel to achieve continuous dense phase flow. In these systems, one bottle is feeding while the other is filling, and thus continuous flow is approached (but never quite achieved) by sequencing the blow bottles.

The CPCBB 10 feeds solids at steady state. The material is fed either volumetrically or gravimetrically from the feed hopper 12 into the continuous blow bottle 16 through variable speed feed means in the form of a variable speed rotary feeder 18. Connected in series therewith is a constant speed rotary feeder 20. The upper variable speed rotary feeder 18 controls the solids feed rate, as required by the process involved. The solids material drops through a drop chute 22 typically made of carbon steel into the maximum duty constant speed rotary feeder 20. The drop chute 22 has a flexible connection or expansion joint 24 to allow for thermal expansion and to isolate the blow bottle with its load cells or strain gauges 52 from the feed hopper 12. The material is then fed from the constant speed feeder 20 into the continuous blow bottle 16 for dense phase transport. The solids flow in dense phase from the blow bottle 16 to the process, as in a PCI system.

The cascading pressure continuous blow bottle 16 is typically mounted on a skid 26 and can be sold as a package. Terminal points of the invention are at the upper rotary feeder inlet flange 19 and at the outlet of the bottle outlet discharge conduit 14. The bottle 16 and drop chute 22 are shop fabricated. The rotary feeders 18, 20 and associated controls and instrumentation are purchased items. The system is subassembled in the shop and shipped to the field for final erection. Suitable bypasses around control valves and the like may be provided as necessary for maintenance or other purposes and, for the sake of conciseness and legibility, are not shown in the drawings. Those skilled in the art familiar with pneumatic solids conveying systems will easily identify the locations and the actual implementation details required.

The bottle 16 is similar to that used on PCI systems. The continuous flow blow bottle is, on average, smaller than a PCI bottle; however, actual sizing will be job specific. The bottle 16 is supported from a support 28 which encircles the bottle 16. Structural steel 30 runs from the support 28 to the skid 26. The skid 26 can be secured to the building floor or to existing structural steel as required.

Fluidizing media such as air or gas on a line 32 flows into a lower fluidizing inlet 33 and then through a perforated plate 34 at the base of the bottle 16. Process media such as air or gas on a line 36 is injected through nozzles 38 located around the periphery of the bottle neck above the lower fluidizing inlet 33. The fine solids enter the bottle 16 through an upper flange opening or inlet 17 and exit in dense phase through inlet end 15 of the bottom pipe 14. Inlet end 15 is located above the perforated plate 34.

The upper variable speed rotary feeder 18 is a heavy duty feeder and can handle pressures up to 20 psig. The feeder speed is varied by means 76 to control solids flow either volumetrically or gravimetrically. The lower constant speed rotary feeder 20 is a maximum duty feeder that can handle pressure differentials up to 50 psig. A valve of this type is manufactured by Beaumont Birch and identified as an 8" SPT Mark II rotary feeder. The primary function of feeder 20 is to seal against the high pressure in the blow bottle 16. The feeders 18, 20 are vented to atmosphere at vents 40 and 42 to prevent the up-draft of air or gas through the feed system.

The drop chute 22 connects the rotary feeders 18 and 20. The chute contains the flexible connection or expansion joint 24 to allow for thermal expansion and to isolate the blow bottle load cells 52 from the feed hopper 12. The expansion joint is of known material (typically stainless steel) and provides strength and flexibility in the drop chute 22. The drop chute 22 can be pressurized by media such as air or gas, thus increasing the pressure of the feed system. The pressure in the drop chute 22 is intermediate between that of the hopper 12 and tank 16. For example, if a bottle pressure of 65 psig is required, the drop chute can be pressurized to 15 psig. Thus, neither the design pressure drop across the lower constant speed rotary feeder is exceeded (65−15=50 psig), nor is the design pressure of the upper variable speed rotary feeder exceeded (20 psig).

Figure 2:
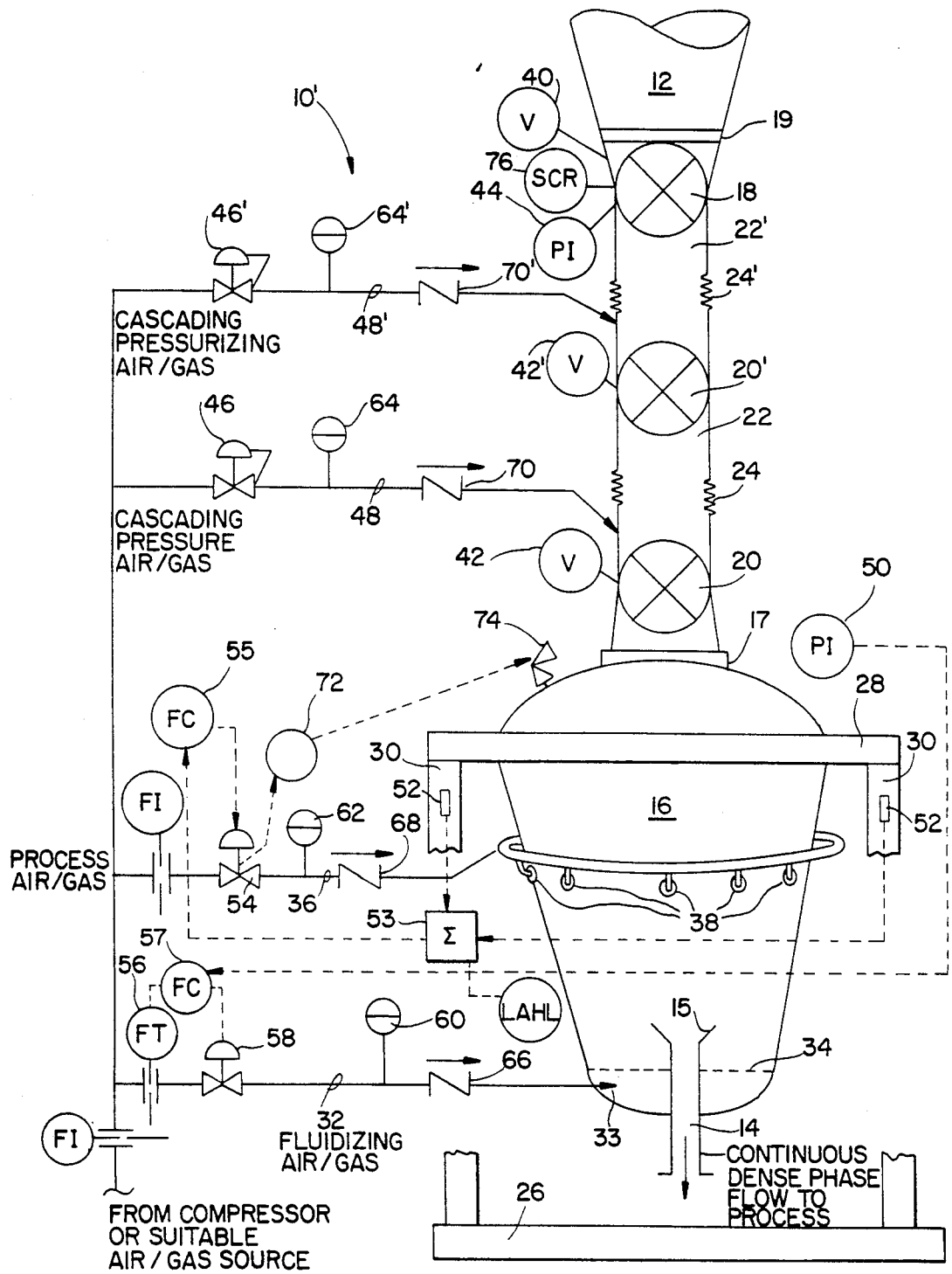
FIG. 2 is a schematic view of another embodiment of the cascading pressure, continuous flow blow bottle system of the present invention, showing how additional constant speed rotary feeders would be employed.

If extremely high blow bottle pressures are required for dense phase transport, a second feeder stage, as shown in FIG. 2, can be added to cascade the pressure of the bottle 16 up to the required level. The same reference numerals represent the same or similar parts; primes indicate those additional elements needed when a second (or more) stage is added. Pressure in chute 22 is indicated by a pressure indicator 44. A self-contained pressure regulating valve 46 on a cascading air or gas line 48 controls the pressure in chute 22. The pressure set point of this valve 46 is preferably manually set, but once set, the valve automatically regulates itself to maintain that setpoint. If desired, an additional level of control could be provided by automatically adjusting the valve 46 based upon a signal representative of the pressure in the bottle 16, and/or the feed hopper 12 pressure, to automatically provide the set point pressure to the valve 46.

A constant solids level is maintained within the bottle 16 by controlling the blow bottle pressure as indicated by pressure indicator/transmitter 50. The bottle solids inventory level in the bottle 16 is monitored by the load cells or strain gauges 52. If the solids inventory level increases, the load cell transmitters 52 send a signal to summing unit 53 and then to flow controller 55 which opens a pressure regulating valve 54 in line 36, thus increasing the bottle pressure. Increased bottle pressure will drive more solids from the tank 16, thus decreasing its weight as measured by the load cells 52. On the other hand, if the solids level decreases, the signal sent by the load cells 52 closes valve 54 to lower the bottle pressure.

Solids flow will be constant as long as the solids inventory level remains within high and low weight limits established within the load cell system. Signals from load cells 52 associated with the support structure 30, are provided to summing unit 53. Preferably, the support system 28 employs an arrangement of 3 load cells or strain gages 52 on three structural steel members 30 since in a three-legged support each has to be loaded to some degree. More than 3 supports 30 is not preferred, since it would be possible for one or more supports 30 to be unloaded. The load on the remaining supports 30 might then be above the normal operating range of each load cell or strain gage 52 and result in an inaccurate measurement. Structural integrity could, of course, also be an issue if the remaining supports 30 are so overloaded.

Because bottle pressure changes with solids feed rate, the fluidizing air or gas *standard* volumetric flow (scfm) must be varied. Fluidizing air or gas flow is controlled by maintaining constant *actual* volumetric flow (acfm) at the temperature and pressure of the blow bottle 16. Thus, a flow orifice 56 is provided upstream of a control valve 58 in fluidizing air or gas line 32, controlled by flow controller 57.

The lines to the feed system include fluidizing air or gas line 32, process air or gas line 36, and cascading pressurizing air or gas line 48. Each line contains a control valve or pressure regulating valve 58, 54 and 46 respectively, a rupture disc 60, 62 and 64 to prevent overpressurizing, and a check valve 66, 68, and 70, to prevent back flow of solids.

Solids flow is increased by increasing the speed of the rotary feeder 18. This causes the solids inventory level in the bottle to rise above the normal level. The load cells 52 detect the increase in weight and send a signal to open process air control valve 54. Valve 54 opens proportionately as the load cell 52 signal increases. The bottle pressure rises until the solids inventory level begins to drop to the normal level, at which time the bottle pressure stablizes. The fluidizing air or gas flow is automatically increased to maintain a constant acfm air or gas flow at the new bottle pressure.

Solids flow is decreased by decreasing the speed of rotary feeder 18. The instantaneous decrease in solids flow from rotary feeder 18 causes the soilds inventory level to drop. Process air or gas valve 54 closes to lower the bottle pressure. If valve 54 closes completely, a limit switch 72 signals a blow bottle vent valve 74 to open so that the bottle vents air until the process air valve 54 reopens and no longer compresses the limit switch. The bottle solids level is then returned to the proper height by the load cell weight control system.

The cascading pressure continuous flow blow bottle feeds continuously utilizing *one* blow bottle and a rotary feeder means. The control system maintains continuous flow at turndown conditions, by varying the speed of the rotary feeder 18 and the pressure in the tank 16 necessary to maintain the solids level inventory within the limits established by the load cell system. Dense phase feed systems previously offered by The Babcock & Wilcox Company and other vendors utilize *two* or more blow bottles operated sequentially; while one is being filled, the other(s) is (are) feeding. The system of the present invention was primarily designed to feed sorbent in dense phase for use in limestone injection systems. Intrafurnace sorbent injection systems do not require a high degree of feed control sophistication as do PC fired blast furnaces. The cascading pressure continuous blow bottle was not designed to replace the PCI system, but rather to provide dense phase flow for use in intrafurnace sorbent injection systems which do not require the sophistication of a PCI system.

While specific embodiments of the invention have been shown and described in detail to illustrate the application of the principles of the invention, it is understood that the invention may be embodied otherwise without departing from such principles. By way of example, while the preferred fluidizing, process and pressurizing media for the present invention is air, it will be appreciated by those skilled in the art that other gases could be utilized, and the foregoing description utilized the "air or gas" nomenclature to emphasize this versatility. The system of the present invention could also be adapted to the transport of other solids, even combustible solids such as pulverized coal. In such an application, an inert gas might be desirable for fluidization, processing and pressurizing at the appropriate locations. Such inert gases could include gases such as nitrogen, carbon dioxide or flue gas. As used herein, inert gas means one that would not support combustion or explosion of the solid material being transported. By way of example, natural gas could be used to pressurize, process and/or fluidize fine solids, so long as mixing of oxidizing elements with the gas is maintained below combustible levels.

What is claimed is:

1. A system for continuously transporting fine solids in dense phase, comprising:

a blow bottle having an upper inlet for receiving fine solids, a lower inlet for receiving fluidizing air and an intermediate inlet for receiving process air, located between said upper and lower inlets;

an outlet conduit connected to said bottle having an inlet end in said bottle above said lower inlet, said outlet conduit discharging dense phase fine solids from said bottle;

weight measuring means operatively connected to said bottle for measuring the weight of said bottle which corresponds to an inventory level of fine solids in said bottle;

variable speed feed means connected to said upper inlet of said bottle for feeding variable flows of fine solids under pressure to said upper inlet, said variable speed feed means being controllable for increasing and decreasing a continuous flow rate of fine solids passing through said bottle to said outlet conduit;

a constant speed seal feeder for receiving said fine solids from said variable speed feed means and having an outlet connected to said upper inlet of said bottle;

fluidizing air supply means connected to said lower inlet for supplying fluidizing air to said bottle;

process air supply means connected to said intermediate inlet for supplying process air to said bottle for varying the pressure in said bottle to maintain a level of fine solids in said bottle, said weight measuring means being operatively connected to said process air supply means for varying a rate of process air introduced into said bottle to increase the pressure in said bottle to increase the flow rate of solids from the bottle with an increasing level of fine solids in said bottle, and to decrease the pressure in said bottle to decrease the flow rate of solids from the bottle with a decreasing level of fine soilds in said bottle; and cascading pressurizing air supply means connected to said variable speed feed means for supplying cascading air under pressure to said variable speed feed means to provide an intermediate pressure level between the inlet of the variable speed feed means and the constant speed seal feeder.

2. The system according to claim 1 wherein said constant speed seal feeder is a rotary feeder that is constructed to operate at a higher pressure differential thereacross that the pressure across said variable speed feed means.

3. The system according to claim 1 including a perforated plate in said bottle between said lower inlet of said bottle and said inlet end of said outlet conduit, for distributing fluidizing air into said bottle.

4. The system according to claim I wherein said intermediate inlet comprises a plurality of circumferentially spaced radial nozzles connected to said bottle for discharging process air into said bottle.

5. The system according to claim I further including a fluidizing air supply conduit connected to said lower inlet and having a controllable fluidizing air valve therein, and wherein said process air supply means includes a process air supply line connected to said intermediate inlet and having a process air control valve therein operatively connected to said weight measuring means to open and close in response to a weight measured by said weight measuring means and vary an amount of process air supplied to said intermediate inlet, and wherein said cascading pressurizing air supply means includes a pressurizing air supply line connected to said drop chute and a pressurizing air valve therein for controlling the pressure of air supplied to said variable speed feed means.

6. The system according to claim 1 wherein said variable speed feed means comprises a feed hopper for containing a supply of fine solids, said hopper having an outlet, a variable speed rotary feeder connected to the outlet of said hopper for conveying fine solids from the outlet of said hopper, a drop chute connected between said variable speed rotary feeder and said constant speed seal feeder for conveying fine solids under pressure from said variable speed rotary feeder to said constant speed seal feeder, said cascading pressurizing air supply means including a pressurizing air line connected to said chute and valve means in said pressurizing air line for controlling the pressure of air supplied to said chute.

7. The system according to claim 6 including a flexible expansion joint in said chute between said variable speed feed means and said constant speed feeder to allow for thermal expansion and to isolate the blow bottle from the feed hopper so that the weight sensed by the weight measuring means is not affected by thermal expansion-induced loads or loads from other components.

8. The system according to claim I including support means connected to said bottle for supporting the weight of said bottle, and wherein said weight measuring means comprises at least one load cell associated with said support means for generating a signal corresponding to the weight of said bottle.

9. The system according to claim 8 wherein said process air supply means comprises a process air supply line connected to said intermediate inlet and a control valve in said process air supply line for regulating a flow of process air in said process air supply line, said control valve being connected to said at least one load cell for control of said control valve by signals from said at least one load cell.

10. The system according to claim 9 including a limit switch connected to said control valve and a vent valve connected to said bottle, said limit switch being operatively connected to said vent valve for opening said vent valve when said limit switch senses the complete closing of said control valve, to reduce pressure in said bottle.

11. A system for continuously transporting fine solids in dense phase, comprising:

a blow bottle having an upper inlet for receiving fine solids, a lower inlet for receiving fluidizing media and an intermediate inlet for receiving process media, located between said upper and lower inlets;

an outlet conduit connected to said bottle having an inlet end in said bottle above said lower inlet, said outlet conduit discharging dense phase fine solids from said bottle;

weight measuring means operatively connected to said bottle for measuring the weight of said bottle which corresponds to an inventory level of fine solids in said bottle;

variable speed feed means connected to said upper inlet of said bottle for feeding variable flows of fine solids under pressure to said upper inlet, said variable speed feed means being controllable for increasing and decreasing a continuous flow rate of fine solids passing through said bottle to said outlet conduit;

a constant speed seal feeder for receiving said fine solids from said variable speed feed means and having an outlet connected to said upper inlet of said bottle;

fluidizing media supply means connected to said lower inlet for supplying fluidizing media to said bottle;

process media supply means connected to said intermediate inlet for supplying process media to said bottle for varying the pressure in said bottle to maintain a level of fine solids in said bottle, said weight measuring means being operatively connected to said process media supply means for varying a rate of process media introduced into said bottle to increase the pressure in said bottle to increase the flow rate of solids from the bottle with an increasing level of fine solids in said bottle, and to decrease the pressure in said bottle to decrease the flow rate of solids from the bottle with a decreasing level of fine solids in said bottle; and cascading pressurizing media supply means connected to said variable speed feed means for supplying cascading media under pressure to said variable speed feed means to provide an intermediate pressure level between the inlet of the variable speed feed means and the constant speed seal feeder.

12. The system according to claim 11 wherein said constant speed seal feeder is a rotary feeder that is constructed to operate at a higher pressure differential thereacross than the pressure across said variable speed feed means.

13. The system according to claim 11 including a perforated plate in said bottle between said lower inlet of said bottle and said inlet end of said outlet conduit, for-distributing fluidizing media into said bottle.

14. The system according to claim 11 wherein said intermediate inlet comprises a plurality of circumferentially spaced radial nozzles connected to said bottle for discharging process media into said bottle.

15. The system according to claim 11 further including a fluidizing media supply conduit connected to said lower inlet and having a controllable fluidizing media valve therein, and wherein said process media supply means includes a process media supply line connected to said intermediate inlet and having a process media control valve therein operatively connected to said weight measuring means to open and close in response to a weight measured by said weight measuring means and vary an amount of process media supplied to said intermediate inlet, and wherein said cascading pressurizing media supply means includes a pressurizing media supply line connected to said drop chute and a pressurizing media valve therein for controlling the pressure of media supplied to said variable speed feed means.

16. The system according to claim 11, wherein the media is air.

17. The system according to claim 11, wherein the media is gas.

18. The system according to claim 11, wherein the media is an inert gas.

19. The system according to claim 11 wherein said variable speed feed means comprises a feed hopper for containing a supply of fine solids, said hopper having an outlet, a variable speed rotary feeder connected to the outlet of said hopper for conveying fine solids from the outlet of said hopper, a drop chute connected between said variable speed rotary feeder and said constant speed seal feeder for conveying fine solids under pressure from said variable speed rotary feeder to said constant speed seal feeder, said cascading pressurizing media supply means including a pressurizing media line connected to said chute and valve means in said pressurizing media line for controlling the pressure of media supplied to said chute.

20. The system according to claim 19 including a flexible expansion joint in said chute between said variable speed feed means and said constant speed feeder to allow for thermal expansion and to isolate the blow bottle from the feed hopper so that the weight measuring means is not affected by thermal expansion-induced loads or loads from other components.

21. The system according to claim 11 including support means connected to said bottle for supporting the weight of said bottle, and wherein said weight measuring means comprises at least one load cell associated with said support means for generating a signal corresponding to the weight of said bottle.

22. The system according to claim 21 wherein said process media supply means comprises a process media supply line connected to said intermediate inlet and a control valve in said process media supply line for regulating a flow of process media on said process media supply line, said control valve being connected to said at least one load cell for control of said control valve by signals from said at least one load cell.

23. The system according to claim 22 including a limit switch connected to said control valve and a vent valve connected to said bottle, said limit switch being operatively connected to said vent valve for opening said vent valve when said limit switch senses the complete closing of said control valve, to reduce pressure in said bottle.

24. A method for continuously transporting fine solids in dense phase from a single blow bottle, comprising:

supplying a variable flow of fine solids under pressure to an upper inlet of the bottle for establishing a level of fine solids in the bottle;

supplying fluidizing media to a lower inlet of the bottle for fluidizing the fine solids in the bottle;

supplying process media to an intermediate inlet of the bottle, which is located between the upper inlet and lower inlet of the bottle, a flow rate of the process media controlling a rate of discharge of fine solids in dense phase from a lower outlet of the bottle;

continuously weighing the bottle to provide a measure of the level of fine solids in the bottle;

controlling the flow rate of process media according to the weight of the bottle to increase and decrease the level of fine solids in the bottle to maintain a selected level in the bottle; and varying the flow rate of fine solids to the upper inlet of the bottle for varying the continuous flow rate of fine solids in dense phase from the outlet of the bottle.

25. The method according to claim 24, wherein the media is air.

26. The method according to claim 24, wherein the media is gas.

27. The method according to claim 24, wherein the media is an inert gas.

28. The method according to claim 24 including supplying the fine solids to the bottle by conveying fine solids from a hopper through a variable speed rotary feeder to a drop chute, conveying the fine solids from the chute over a constant speed rotary feeder to the upper inlet of the bottle, and supplying cascading pressurizing media to the chute.

29. The method according to claim 28 including operating the variable speed rotary feeder at a lower pressure than the constant speed rotary feeder.

30. The method according to claim 29 including weighing the bottle by supporting the bottle on a support structure and positioning at least one load call on the support structure which generates a weight signal.

31. The method according to claim 30 including supplying the process media over a process media line having a control valve therein, and connecting the control valve to the at least one load cell for opening and closing the control valve according to the weight signal from the at least one load cell.

32. The method according to claim 31 including connecting a vent valve to the bottle, the vent valve being operatively connected to the control valve for opening when the control valve is completely closed.

* * * * *